United States Patent [19]

Kimizuka et al.

[11] Patent Number: 4,882,782
[45] Date of Patent: Nov. 21, 1989

[54] SAFETY APPARATUS FOR DETECTING AN ABNORMALITY OF POWER CONTROL ELEMENT

[75] Inventors: Junichi Kimizuka, Yokohama; Yukihide Ushio, Tokyo; Kaoru Seto, Chigasaki; Kenjiro Hori, Yokohama; Toshihiko Inuyama, Fujisawa, all of Japan

[73] Assignee: Canon Kabushiki Kaisha, Tokyo, Japan

[21] Appl. No.: 96,806

[22] Filed: Sep. 10, 1987

Related U.S. Application Data

[63] Continuation of Ser. No. 690,941, Jan. 14, 1985, abandoned.

[30] Foreign Application Priority Data

Jan. 23, 1984 [JP] Japan ................................. 59-8504

[51] Int. Cl.⁴ .............................................. H02H 3/00
[52] U.S. Cl. ..................................... 361/100; 361/94; 361/104; 361/89; 219/492; 219/501
[58] Field of Search ......................... 361/23, 24, 30, 31, 361/86, 87, 92, 93, 98, 100, 101, 103, 104, 161; 219/482, 489, 490, 492, 501

[56] References Cited

U.S. PATENT DOCUMENTS

| | | | |
|---|---|---|---|
| 3,848,140 | 11/1974 | Guermeur | 323/244 |
| 4,065,802 | 12/1977 | Mizukawa et al. | 361/86 |
| 4,071,874 | 1/1978 | Matin | 361/94 |
| 4,109,134 | 8/1978 | Herten | 219/501 |
| 4,277,671 | 7/1981 | Mori et al. | 219/492 |
| 4,315,297 | 2/1982 | Kobayashi | 361/93 |
| 4,320,434 | 3/1982 | Stirk | 361/86 |
| 4,357,645 | 11/1982 | Lilienthal | 361/93 |
| 4,369,354 | 1/1983 | Goedecke et al. | 219/492 |
| 4,415,884 | 11/1983 | Delin et al. | 361/100 |
| 4,598,195 | 7/1986 | Matsuo | 219/501 |

Primary Examiner—A. D. Pellinen
Assistant Examiner—H. L. Williams
Attorney, Agent, or Firm—Fitzpatrick, Cella, Harper & Scinto

[57] ABSTRACT

A safety apparatus for an AC control circuit has a bidirectional thyristor, a photocoupler for detecting a load current, a transistor and a self-hold circuit for checking if a detection output from the photocoupler indicates a failure of the thyristor to commutate or lack of a trigger signal and another transistor which is turned on to blow a fuse and to cut off the load current when a failure of the thyristor to commutate or lack of the trigger signal is detected.

7 Claims, 6 Drawing Sheets

SAFETY APPARATUS FOR DETECTING AN ABNORMALITY OF POWER CONTROL ELEMENT

This application is a continuation of application Ser. No. 690,941 filed Jan. 14, 1985, now abandoned.

BACKGROUND OF THE INVENTION

1. Field of the Invention

The present invention relates to a safety circuit in a circuit for controlling an AC current flowing in a load by means of a semiconductor control rectifying element such as a thyristor or bidirectional thyristor (triac).

2. Description of the Prior Art

FIG. 2 shows an example of a conventional AC control circuit. As shown in FIG. 2, an AC voltage is applied between terminals 1 and 2 of an AC control circuit 22. A load 3 such as a fixing heater of a fixer and a bidirectional thyristor 4 as a semiconductor control rectifying element are series-connected between the terminals 1 and 2.

A trigger pulse to be applied to a gate G of the bidirectional thyristor 4 is applied between terminals 5 and 6.

A photocoupler 7 comprises an LED 8 and a phototransistor 11. One terminal 7-1 of the photocoupler 7 is connected to the terminal 5 through a current limiting resistor 9. The other terminal 7-2 of the photocoupler 7 is connected to the terminal 6. A diode 10 is reverse-biased between the two ends of the LED 8. When the trigger pulse is applied between the terminals 5 and 6, the LED 8 is turned on. The phototransistor 11 partially constituting the photocoupler 7 is turned on, a transistor 12 is turned on, and a current flows to the gate G of the bidirectional thyristor 4 and turns it on. Resistor 13A and 13B are for flowing a gate current, and a resistor 14 and a capacitor 15 are for noise filtering, i.e. providing a path for noise to be eliminated regardless of the state of the bidirectional thyristor 4.

A varistor 16 serves to prevent flow of a surge current. A resistor 17, a diode 18, and an electrolytic capacitor 19 constitute a half wave rectifying circuit. A Zener diode 20 generates a fixed voltage across the two ends of the electrolytic capacitor 19. A resistor 21 determines a base voltage of the transistor 12.

In the circuit arrangement described above, even if a gate trigger pulse is not applied to the bidirectional thyristor 4, anodes A1 and A2 of the bidirectional thyristor 4 form a short circuit and an AC current may be kept flowing to the load 3. Thus, when the load 3 is a heater, the heater may be overheated or may cause a fire.

SUMMARY OF THE INVENTION

The present invention has been made to resolve the above problem.

It is another object of the present invention to provide an improved safety apparatus.

It is still another object of the present invention to provide a safety apparatus which controls current supply to a load so as to prevent overheating of the load when a power control element is abnormal.

It is still another object of the present invention to provide a safety apparatus which controls current supply to a load so as to prevent overheating of the load when a control signal of a power control element is abnormal.

The above and other objects, features and advantages of the present invention will become apparent from the following description and the appended claims taken in conjunction with the accompanying drawings.

DETAILED DESCRIPTION OF THE PREFERRED EMBODIMENTS

The present invention will be described in detail below with reference to the accompanying drawings.

Figure 1:
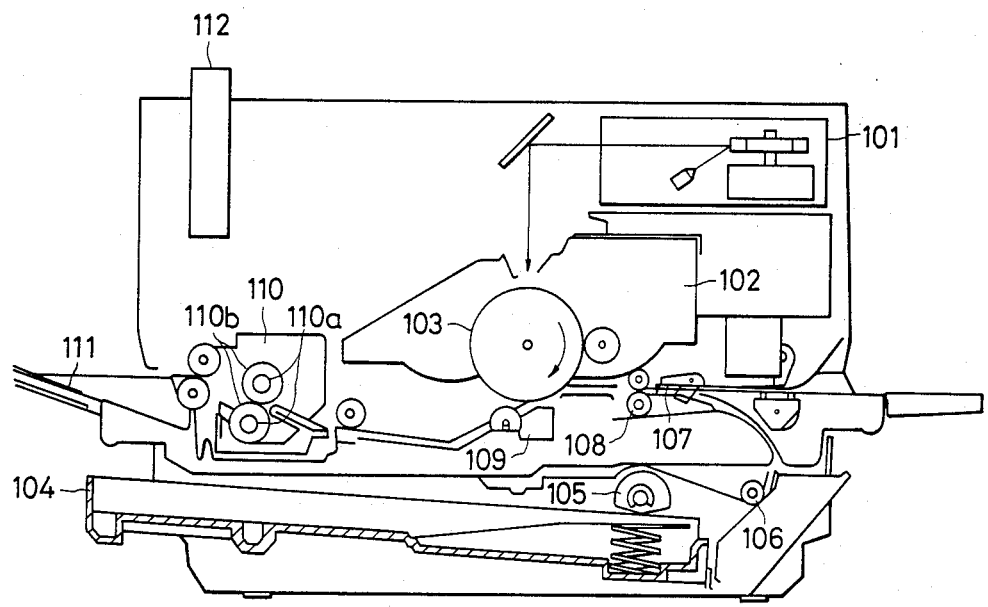
FIG. 1 is a schematic sectional view of an apparatus according to the present invention.

FIG. 1 is a schematic sectional view of a laser beam printer to which the present invention can be applied.

Referring to FIG. 1, an exposure device 101 has a scanner and a laser unit. A developing unit 102 is for visualizing a latent image formed on a photosensitive drum 103. A pickup roller 105 picks up each paper sheet from a paper cassette 104 and supplies it to a convey roller 106. A paper sheet conveyed by the convey roller 106 is temporarily stopped by a register shutter 107 so as to synchronize projection of a laser beam, rotation of the photosensitive drum 103 and feeding of the paper sheet. Feed rollers 108 are for feeding the paper sheet to a transfer unit 109. A fixing unit 110 fixes a toner image transferred onto the paper sheet. A heater 110a is for heating a fixing foller 110b. A stacker 111 is for receiving the exhausted paper sheet. A programmable ROM 112 is detachable and is used as a character generator.

In a laser-beam printer having the above arrangement, timing control of a series of operations such as conveying of paper sheets, formation of characters, and development is performed by a central processing unit (CPU, not shown).

Figure 3:
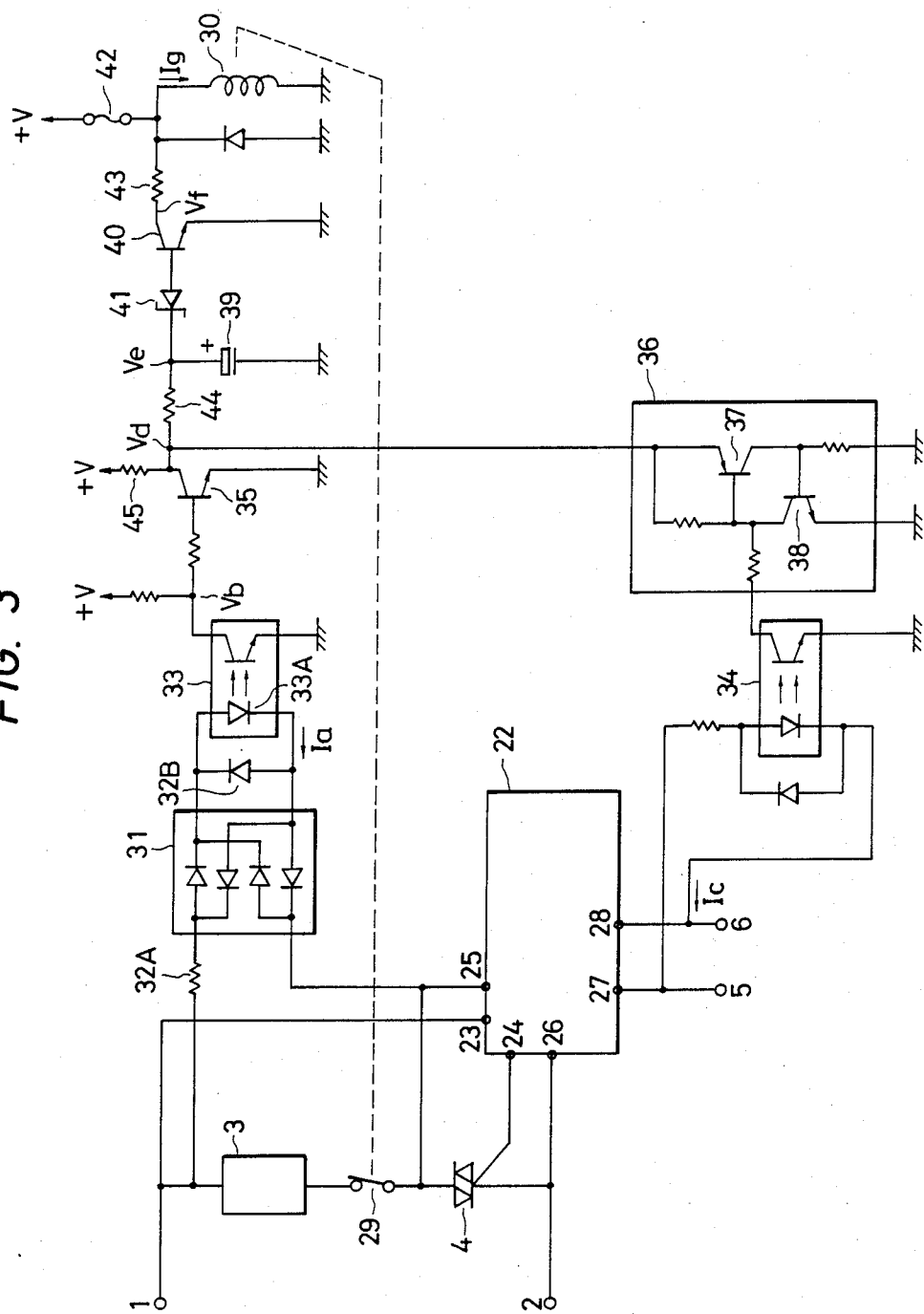
FIG. 3 is a circuit diagram according to an embodiment of the present invention.

FIG. 3 shows an embodiment of the present invention.

Figure 2:
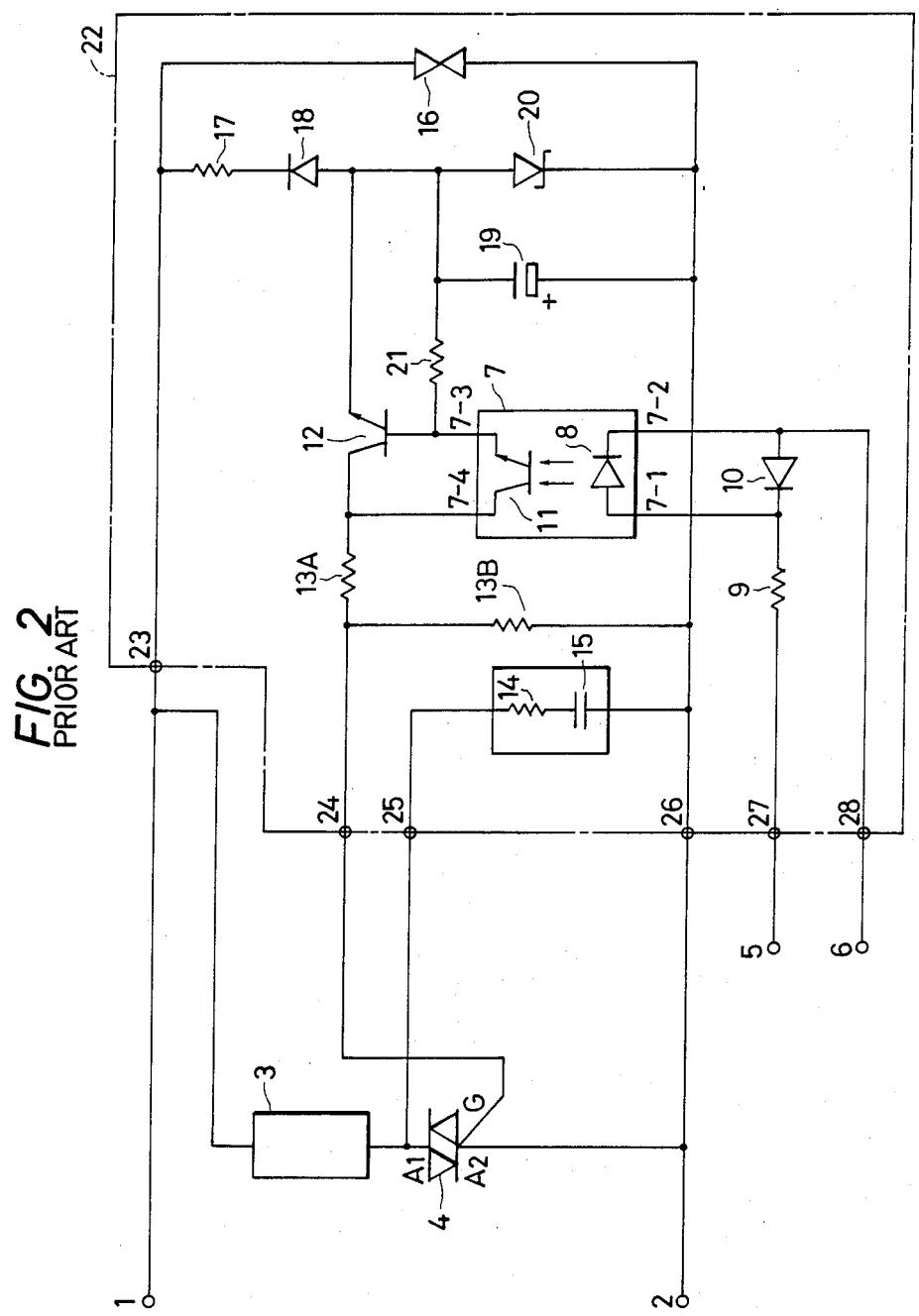
FIG. 2 is a circuit diagram of a conventional AC control circuit.

A unit 22 is the same as that shown in FIG. 2, and a detailed description thereof is omitted. The unit 22 has terminals 23 to 28.

Referring to FIG. 3, a relay contact 29 is arranged in series with a load 3. The relay contact 29 is opened or closed by a relay coil 30. A current from a DC power source V (not shown) constantly flows to the relay coil 30 to close the contact 29.

Figure 4:
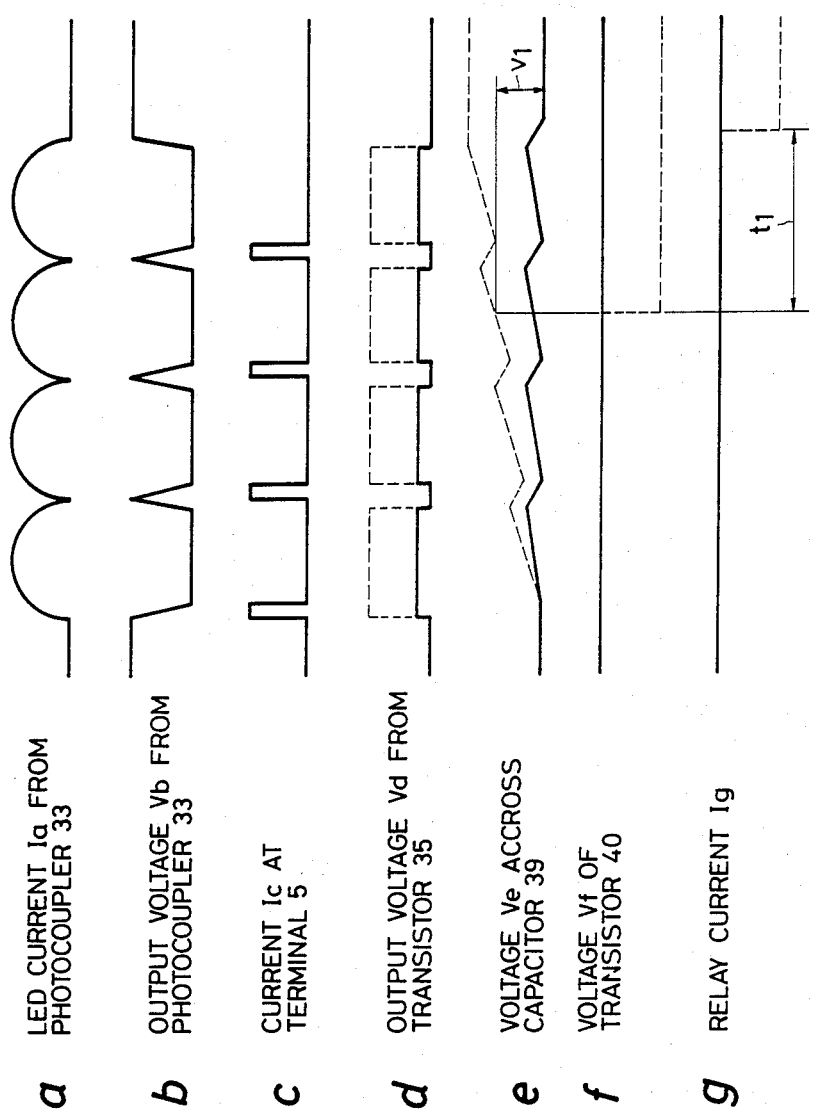
FIGS. 4a–4g are a timing chart of the circuit shown in FIG. 3.

When the bidirectional thyristor 4 is turned on, a current flows to a diode bridge 31 through a resistor 32A. The current having a full-wave rectified waveform as shown in FIG. 4a is obtained and flows into an LED 33A of a photocoupler 33. A diode 32B serves as a protective diode of the LED 33A.

The waveform of an output voltage Vb of the photocoupler 33 is as shown in FIG. 4b. A trigger waveform C of the bidirectional thyristor 4 is as shown in FIG. 4c when it is shown by a waveform of a current Ic at a terminal 5.

An electrically isolating device such as a photocoupler 34 is driven by the current Ic having the waveform C.

A self-hold circuit 36 consists of a pnp transistor 37 and an npn transistor 38. When a trigger pulse is applied to the photocoupler 34, the circuit 36 holds the ON state of the transistors 37 and 38 until the emitter voltage of the transistor 37 drops to near 0 V. Thus, the self-hold state of the circuit 36 is released every time a transistor 35 is turned on. An output voltage Vd from the transistor 35 changes as indicated by the dotted line in FIG. 4d if the circuit 36 is omitted since a voltage drop across the circuit 36 need not be considered. However, when the transistors 37 and 38 are turned on, the output voltage Vd has a low voltage waveform as indicated by the solid line shown in FIG. 4d.

When the bidirectional thyristor 4 is normally switched by a trigger signal applied to the terminal 5, the output voltage from the transistor 35 is small and almost no charge is accumulated on a capacitor 39. Therefore, a voltage Ve across the capacitor 39 becomes as indicated by the solid line in FIG. 4e. Since the voltage Ve does not exceed the base-emitter voltage of a transistor 40 and the Zener voltage of a Zener diode 41, the transistor 40 is not turned on.

When the bidirectional thyristor 4 is turned on even if no trigger pulse is applied to the terminal 5, no output is obtained from the photocoupler 34 and the self-hold circuit 36 is turned off. Therefore, the output voltage from the transistor 35 is increased, and a charge is accumulated on the capacitor 39. The voltage Ve becomes as indicated by the dotted line in FIG. 4e. When the voltage Ve exceeds a sum voltage V1 of the base-emitter voltage of the transistor 40 and the Zener voltage of the Zener diode 41, the transistor 40 is turned on. An output voltage Vf of the transistor 40 is as indicated by the solid line in FIG. 4f (OFF) in the normal state and as indicated by the dotted line in FIG. 4f (ON) in the abnormal state (when the voltage of the capacitor 39 exceeds V1). Thus, in the abnormal state, the transistor 40 is turned on to allow the flow of a large current to a fuse 42 and a resistor 43. The fuse 42 is blown, no current flows to the relay coil 30, the relay contact 29 is opened, and a current which has been flowing to the load 3 is cut off. A charge time constant of the capacitor 39 which is determined by resistors 44 and 45 and the capacitor 39 is selected so that the transistor 40 will not be turned on by several misfirings of the bidirectional thyristor 4.

The fuse 42 is current-limited by the resistor 43 and is blown within a predetermined period of time t1 (determined by the fusing characteristics of the fuse) when the transistor 40 is turned on. A current Ig flowing to the relay 30 is as indicated in FIG. 4g; the solid line in the normal state and the dotted line in the abnormal state.

The self-hold circuit 36 can comprise a thyristor, a gate turn-on transistor or a flip-flop circuit of transistors. The fuse 42 can comprise a circuit breaker. When resistors and transistors are selected so that no current flows to the Zener diode 41 in the abnormal state, an integrator consisting of the resistor 44 and the capacitor 39 can be omitted.

As described above, the circuit according to the present invention has a discrimination circuit which consists of the photocoupler 33 for detecting a load current, the transistor 35 for determining if the detection output obtained is a result of application of a normal trigger signal of the bidirectional thyristor 4 to the terminal 5, and the self-hold circuit 36.

When the discrimination circuit determines that the current flowing to the load 3 is an abnormal load current, the fuse 42 is blown by the transistor 40, the relay 30 is turned off, and the current flow to the load is cut off. Thus flow of a surge current to the load 3 and resultant damage to the load 3 are prevented.

Since the fuse 42 is blown to cut off the current flow to the relay, the load is protected even after the circuit is reset. If the fuse 42 is a visible fuse such as a fuse within a glass tube, occurrence of an abnormality can be visually determined with ease.

If an annunciator such as an LED is turned on or flashed or a buzzer is operated to produce a warning sound when the contact 29 is turned off, abnormality can also be easily determined.

As described above, according to the present invention, in a control circuit for controlling an AC current flowing to a load by means of a semiconductor control rectifying element, an accidental flow of an abnormal current to the load and overheating of the load can be prevented.

Figure 5:
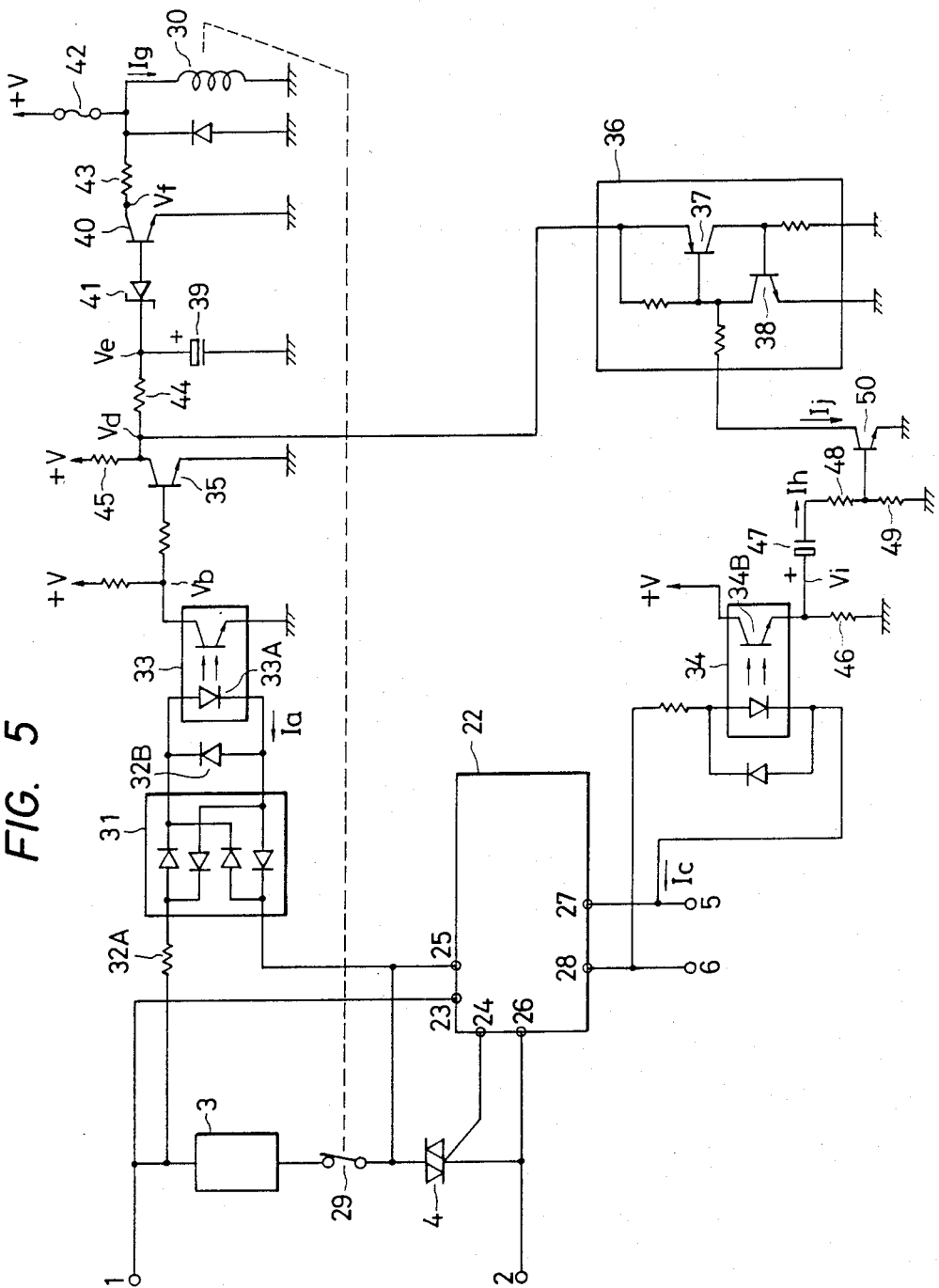
FIG. 5 is a circuit diagram of another embodiment of present invention.

A second embodiment of the present invention will now be described. FIG. 5 is a circuit showing the circuit configuration according to the second embodiment. The same reference numerals as in FIG. 3 denote similar parts with similar functions.

The characteristic feature of this embodiment is that an output of a photocoupler 34 and a self-hold circuit 36 are coupled through a capacitor.

Figure 6:
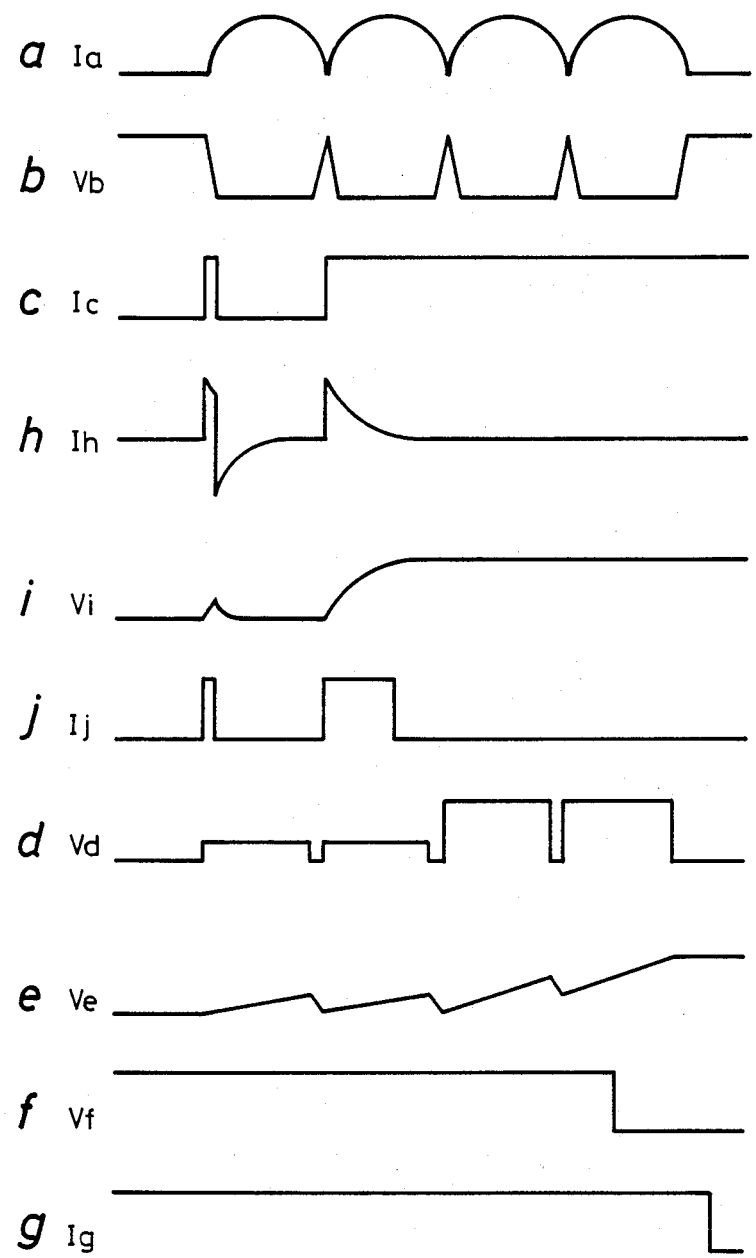
FIG. 6a–FIG. 6g are a timing chart of the circuit shown in FIG. 5.

When a current flows to a phototransistor 34B of the photocoupler 34, the current flows to a resistor 46. A potential at an end of the resistor 46 at the side of the phototransistor 34B is increased. Then, a current flows to an electrolytic capacitor 47 and to resistors 48 and 49, and a transistor 50 is turned on. The capacitor 47 transfers an output from the photocoupler 34 to the transistor 50 by AC coupling When the phototransistor 34B of the photocoupler 34 is OFF, no current flows to the transistor 50 However, when the phototransistor 34B is turned on, a charging current Ih for charging the capacitor 47 flows As shown in FIG. 6c, when the ON state is maintained, a charge is gradually accumulated on the capacitor 47. As a voltage Vi across the two ends of the capacitor 47 approaches the power sources voltage V, the charging current Ih is gradually decreased. When the charging current Ih is gradually decreased, a base current for maintaining the transistor 50 ON no longer flows. Then the collector current Ii of the transistor 50 no longer flows and the self-hold circuit 36 cannot be triggered. When the output from the photocoupler 34 is kept, the self-hold circuit 36 cannot be retriggered. When a current flows to a triac 4 in this state, the waveform of a collector voltage Vd of a transistor 35 becomes as shown in FIG. 6d. Therefore, a voltage Ve across the two ends of a capacitor 39 becomes as shown in FIG. 6e. When the charging voltage Ve exceeds the sum of the Zener voltage of a Zener diode 41 and the base-emitter voltage of a transistor 40, the transistor 40 is turned on and a surge current flows to a fuse 42. After the fuse is blown in a time period determined by its fusing characteristics, a current Ig no longer flows to a relay coil 30, a relay contact 29 is opened, and no current flows to a load 3.

In this embodiment, trigger pulse transfer of the self-hold circuit 36 triggered by a gate trigger pulse of the semiconductor control rectifying element (triac) 4 is performed not by DC coupling but by AC coupling through the capacitor 47. In this arrangement, when the LED driver circuit of the photocoupler 34 short-circuits, for example, and the triac 4 is kept triggered while the trigger pulse of the triac 4 is ON, an abnormality can be detected.

The present invention is not limited to the above embodiments, and various changes and modifications may be made within the spirit and scope of the present invention.

What we claimed is:

1. A safety apparatus in a circuit for controlling an alternating current flowing in a load responsive to a control signal, said safety apparatus comprising:

a power control element for controlling a supply of the alternating current to the load;

control signal input means for inputting the control signal to control said power control element;

first detecting means for detecting an operating condition of said power control element, said operating condition being one of the group consisting of ON and OFF conditions;

second detecting means for detecting whether the control signal has been input to said control signal input means, wherein said second detecting means includes self-hold means for setting a self-holding condition if the control signal has been input and resetting said self-holding condition of said self-hold circuit in synchronization with the alternating current supplied to the load;

third detecting means for detecting an abnormality of said power control element if said first detecting means is detecting said ON condition and said self-holding condition of said second detecting means is reset;

fourth detecting means for detecting and forming an output if said third detecting means detects said abnormality over a time period of a half cycle of the alternating current; and cutting means for cutting off the alternating current to the load in response to the output of said fourth detecting means, wherein said cutting means includes a fuse and a switch, said fuse being arranged to be blown in response to the output from said fourth detecting means, and said switch being arranged to cut the alternating current to the load in response to said fuse being blown.

2. A safety apparatus according to claim 1, wherein said cutting means cuts off the alternating current to the load upon detection of an ON condition of said power control element by said first detecting means when said second detecting means detects that the control signal has not been input.

3. A safety apparatus according to claim 1, further comprising an impedance element for electrically connecting said control signal input means to said second detecting means.

4. A safety apparatus according to claim 1, wherein said self-hold means comprises an electrically isolated signal transmitting means.

5. A safety apparatus according to claim 4, wherein said signal transmitting means includes a photocoupler.

6. A safety apparatus according to claim 1, further comprising annunciator means for annunciating that the alternating current flowing into the load has been cut off when such is the case.

7. A saftey apparatus according to claim 1, wherein said fourth detecting circuit includes an intergrating circuit with a time constant which is larger than a time period of a half cycle of the alternating current.

* * * * *